US010596927B2

(12) United States Patent
Herrera Barrera (10) Patent No.: US 10,596,927 B2
(45) Date of Patent: Mar. 24, 2020

(54) VEHICLE SEATING ASSEMBLY

(71) Applicant: Ford Global Technologies, LLC, Dearborn, MI (US)

(72) Inventor: Daniel Herrera Barrera, Iztacalco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 15/725,841

(22) Filed: Oct. 5, 2017

(65) Prior Publication Data

US 2019/0106022 A1    Apr. 11, 2019

(51) Int. Cl.
| | |
|---|---|
| *B60N 2/34* | (2006.01) |
| *B60N 2/12* | (2006.01) |
| *B60R 22/26* | (2006.01) |
| *B60N 2/835* | (2018.01) |
| *B60N 2/30* | (2006.01) |
| *B60N 2/36* | (2006.01) |
| *B60N 2/02* | (2006.01) |
| *B60N 2/90* | (2018.01) |

(52) U.S. Cl.
CPC .............. *B60N 2/12* (2013.01); *B60N 2/305* (2013.01); *B60N 2/3011* (2013.01); *B60N 2/3056* (2013.01); *B60N 2/3065* (2013.01); *B60N 2/34* (2013.01); *B60N 2/36* (2013.01); *B60N 2/835* (2018.02); *B60R 22/26* (2013.01); *B60N 2/0224* (2013.01); *B60N 2/919* (2018.02); *B60N 2002/363* (2013.01); *B60N 2205/30* (2013.01); *B60R 2022/266* (2013.01)

(58) Field of Classification Search
CPC ... B60N 2/32; B60N 2/34; B60N 2/36; B60N 2/12; B60N 2/14; B60N 2/143; B60N 2/30; B60N 2/3038; B60N 2/3034; B60N 2/3063; B60N 2/3065; B60N 2/3068; B60N 2/307; B60N 2/646; B60N 2002/363; B64D 11/0641; A47C 17/045
USPC .......................................................... 297/131
See application file for complete search history.

(56) References Cited

U.S. PATENT DOCUMENTS

| | | | | |
|---|---|---|---|---|
| 817,139 | A * | 4/1906 | Coopersmith | A47C 17/045 5/705 |
| 1,668,167 | A * | 5/1928 | McKenna | B60N 2/34 296/69 |
| 1,980,559 | A * | 11/1934 | Thompson | B60N 2/34 297/66 |
| 2,231,822 | A * | 2/1941 | Austin | B60N 2/34 296/64 |
| 2,248,603 | A * | 7/1941 | Bell | A47C 17/2076 297/105 |
| 2,562,197 | A * | 7/1951 | Martin | A47C 17/161 5/154 |

(Continued)

FOREIGN PATENT DOCUMENTS

| | | |
|---|---|---|
| CN | 205365291 U | 7/2016 |
| EP | 0861165 B1 | 11/1996 |
| WO | 2015070287 A1 | 5/2015 |

*Primary Examiner* — Kyle J. Walraed-Sullivan
(74) *Attorney, Agent, or Firm* — David Coppiellie; Price Heneveld LLP (57) ABSTRACT

A vehicle seating assembly includes an upper seatbase pivotably coupled to a lower seatbase at a front end by a front hinge. The lower seatbase is slidably coupled to a rail. A seatback is pivotably coupled to a rear end of the upper seatbase by a rear hinge.

20 Claims, 5 Drawing Sheets

(56) References Cited

U.S. PATENT DOCUMENTS

| | | | | |
|---|---|---|---|---|
| 2,602,169 A * | 7/1952 | McDaniel | A47C 17/2076 | 5/23 |
| 2,623,574 A * | 12/1952 | Damsch | A47C 1/146 | 297/1 |
| 2,698,648 A * | 1/1955 | Kronheim | A47C 7/347 | 297/110 |
| 3,360,806 A * | 1/1968 | Dunaway | B60R 13/01 | 5/118 |
| 3,555,581 A * | 1/1971 | Friant | A47C 3/16 | 5/705 |
| 3,736,023 A * | 5/1973 | Lyons | A47C 13/00 | 297/118 |
| 3,751,739 A * | 8/1973 | Assmann | A47C 17/045 | 5/12.1 |
| 3,902,759 A * | 9/1975 | Monteforte | A47C 17/045 | 297/452.16 |
| 3,924,893 A * | 12/1975 | Ferrara | B60N 2/5621 | 297/452.46 |
| 4,173,045 A * | 11/1979 | Osborn | A47C 17/045 | 5/118 |
| 4,186,960 A * | 2/1980 | Mizelle | B60N 2/34 | 248/430 |
| 4,326,309 A * | 4/1982 | Flaum | A47C 17/045 | 297/440.15 |
| 4,402,096 A * | 9/1983 | Atimichuk | A47C 17/1753 | 5/17 |
| 4,443,901 A * | 4/1984 | Zimmerman | A47C 17/24 | 5/12.1 |
| 4,473,250 A * | 9/1984 | Truex | B60P 3/36 | 296/37.16 |
| 4,487,451 A * | 12/1984 | Fiorini | B60N 2/34 | 297/219.1 |
| 4,512,048 A * | 4/1985 | Isham | A47C 17/1756 | 297/317 |
| 4,518,203 A * | 5/1985 | White | A47C 17/045 | 297/108 |
| 4,543,675 A * | 10/1985 | Shrock | A47C 17/161 | 5/18.1 |
| 4,563,037 A * | 1/1986 | Tiffany | A47C 17/2073 | 297/105 |
| 4,620,335 A * | 11/1986 | Dodgen | B60N 2/34 | 296/69 |
| 4,625,346 A * | 12/1986 | Quackenbush | A47C 17/161 | 297/342 |
| 4,637,081 A * | 1/1987 | Clark | A47C 17/16 | 114/363 |
| 4,654,907 A * | 4/1987 | Haugaard | A45C 3/10 | 297/17 |
| 4,735,456 A * | 4/1988 | Haefelfinger | B60N 2/34 | 297/243 |
| 4,905,330 A * | 3/1990 | Jacobs | A47C 17/045 | 482/23 |
| 5,086,529 A * | 2/1992 | DeGroot | A47C 27/001 | 5/710 |
| 5,171,064 A * | 12/1992 | Boussaroque | A47C 7/38 | 297/112 |
| 5,195,194 A * | 3/1993 | Bradley | A47C 17/161 | 5/37.1 |
| 5,560,056 A * | 10/1996 | Tai | A45F 3/22 | 297/118 |
| 5,711,505 A * | 1/1998 | Nemoto | B60N 2/01516 | 248/424 |
| 5,718,479 A * | 2/1998 | Rautenbach | A47C 17/80 | 297/353 |
| 5,795,023 A * | 8/1998 | Kayumi | B60N 2/3013 | 297/331 |
| 5,868,451 A * | 2/1999 | Uno | B60N 2/3011 | 296/65.05 |
| 5,871,255 A * | 2/1999 | Harland | B60N 2/3011 | 296/65.05 |
| 5,904,401 A * | 5/1999 | Alberda | A47C 17/2076 | 297/354.13 |
| 6,000,751 A * | 12/1999 | Kato | B60N 2/3011 | 296/65.16 |
| 6,010,190 A * | 1/2000 | Downey | B60N 2/123 | 297/331 |
| 6,015,186 A * | 1/2000 | Grieger | B60N 2/30 | 296/69 |
| 6,170,913 B1 * | 1/2001 | Seibold | B60N 2/305 | 297/316 |
| 6,270,155 B1 * | 8/2001 | Rashid | A47C 3/16 | 297/1 |
| 6,823,545 B1 * | 11/2004 | Davis | A47C 16/02 | 5/630 |
| 6,877,807 B2 * | 4/2005 | Mizuno | B60N 2/305 | 297/188.08 |
| 7,213,882 B2 * | 5/2007 | Dryburgh | A47C 1/0352 | 297/354.13 |
| 7,490,896 B2 * | 2/2009 | Smith | B60N 2/3011 | 297/188.04 |
| 7,523,985 B2 * | 4/2009 | Bhatia | B60N 2/206 | 297/188.04 |
| 8,225,438 B2 * | 7/2012 | Murphy | A47C 17/17 | 5/13 |
| 9,622,587 B2 * | 4/2017 | Murphy | A47C 17/2073 | |
| 9,854,916 B2 * | 1/2018 | Murphy | A47C 17/165 | |
| 9,895,002 B1 * | 2/2018 | Cooke | A47C 17/165 | |
| 9,901,180 B2 * | 2/2018 | Klaseen | A47C 1/143 | |
| 2001/0008337 A1* | 7/2001 | Ganesan | B60R 22/02 | 280/801.1 |
| 2002/0005649 A1* | 1/2002 | Hofmann | B60R 7/043 | 296/37.15 |
| 2002/0033623 A1* | 3/2002 | Sunohara | B60N 2/3011 | 297/331 |
| 2002/0145301 A1* | 10/2002 | Kuo | B60N 2/0232 | 296/65.09 |
| 2004/0155505 A1* | 8/2004 | Schrimsher, Sr. | A47C 17/17 | 297/343 |
| 2005/0040689 A1* | 2/2005 | Henning | B60N 2/3031 | 297/354.13 |
| 2005/0104432 A1* | 5/2005 | Pena | B60N 2/34 | 297/354.13 |
| 2007/0151023 A1* | 7/2007 | Murphy | A47C 17/17 | 5/13 |
| 2007/0283491 A1* | 12/2007 | Murphy | A47C 17/20 | 5/13 |
| 2008/0093502 A1* | 4/2008 | Bettell | B64D 11/06 | 244/118.5 |
| 2008/0106131 A1* | 5/2008 | Behrens | B60N 2/3013 | 297/232 |
| 2008/0122279 A1* | 5/2008 | Park | B60N 2/01 | 297/332 |
| 2008/0185866 A1* | 8/2008 | Tarrant | B60N 2/6009 | 296/97.22 |
| 2008/0224524 A1* | 9/2008 | Mather | B60N 2/3011 | 297/378.1 |
| 2010/0201163 A1* | 8/2010 | Dunkel | B60N 2/0232 | 297/124 |
| 2011/0298340 A1* | 12/2011 | Nelson | A47C 13/005 | 312/111 |
| 2012/0049593 A1* | 3/2012 | Inou | B60N 2/643 | 297/284.1 |
| 2012/0313394 A1* | 12/2012 | Barrow | B60N 2/3011 | 296/64 |
| 2013/0328370 A1* | 12/2013 | Wilfer | B60N 2/20 | 297/257 |
| 2014/0265473 A1* | 9/2014 | Chen | B60N 2/4249 | 297/216.13 |
| 2015/0183353 A1* | 7/2015 | Chen | B60N 2/646 | 297/452.29 |
| 2015/0291070 A1* | 10/2015 | Kitajima | B60N 2/58 | 297/452.21 |
| 2016/0088951 A1* | 3/2016 | McGuinness | A47C 27/001 | 5/35 |
| 2016/0176315 A1* | 6/2016 | Moore | B60N 2/0292 | 297/108 |
| 2016/0280377 A1* | 9/2016 | Pinkal | B64D 11/064 | |
| 2016/0339813 A1* | 11/2016 | Dubois | B60N 2/0232 | |

(56) References Cited

U.S. PATENT DOCUMENTS

| | | | |
|---|---|---|---|
| 2017/0232876 A1* | 8/2017 | Shimoda | B60N 2/80 |
| | | | 297/452.3 |
| 2017/0240068 A1* | 8/2017 | Ramachandra | B60N 2/1615 |
| 2017/0275003 A1* | 9/2017 | Erhel | B60N 2/06 |
| 2018/0265010 A1* | 9/2018 | Line | B60N 2/22 |
| 2018/0272896 A1* | 9/2018 | Park, II | B60N 2/995 |
| 2018/0272904 A1* | 9/2018 | Line | B60N 2/914 |
| 2019/0106034 A1* | 4/2019 | Leon Guerrero | A01K 1/0272 |
| 2019/0152358 A1* | 5/2019 | Kawakami | B62D 33/02 |
| 2019/0168658 A1* | 6/2019 | Keziah | B60N 2/206 |

* cited by examiner

VEHICLE SEATING ASSEMBLY

FIELD OF THE DISCLOSURE

The present disclosure generally relates to a vehicle seating assembly. More specifically, the present disclosure relates to an articulating vehicle seating assembly.

BACKGROUND OF THE INVENTION

Vehicles are typically equipped with one or more rows of vehicle seating assemblies. Conventional vehicle seating assemblies, at best, allow an occupant to recline the vehicle seating assembly a limited amount. However, during extended trips or long rides, the conventional vehicle seating assemblies often become uncomfortable to rest or sleep in. Accordingly, there is a need for vehicle seating assemblies that are capable of providing an occupant with a comfortable resting area.

SUMMARY OF THE INVENTION

According to a first aspect of the present disclosure, a vehicle seating assembly includes an upper seatbase pivotably coupled to a lower seatbase at a front end by a front hinge. The lower seatbase is slidably coupled to a rail. A seatback is pivotably coupled to a rear end of the upper seatbase by a rear hinge.

Embodiments of the first aspect of the present disclosure can include any one or a combination of the following features:
- a horizontal position is achieved by actuating the seatback and the upper seatbase in a forward direction while simultaneously sliding the lower seatbase rearward;
- the vehicle seating assembly further includes a concave portion in each of the seatback, the upper seatbase, and the lower seatbase, wherein the concave portions are positioned to align with one another when in the horizontal position;
- the vehicle seating assembly further includes a raised portion on a backside of the seatback and positioned above the concave portion on the seatback, wherein the raised portion is configured as a head cushion in the horizontal position;
- the raised portion is a headrest that has been rotated from a top portion of the seatback to the backside of the seatback;
- the concave portions have a first depth and a second depth, wherein the first depth is greater than the second depth;
- the vehicle seating assembly further includes a restraint system that is accessible in the horizontal position, wherein the restraint system is coupled to the seatback and the upper seatbase;
- the restraint system restrains an occupant in horizontal and vertical directions; and
- the vehicle seating assembly further includes a release mechanism positioned on the lower seatbase that is configured to transition the vehicle seating assembly from the horizontal position to an L-shaped position.

According to a second aspect of the present disclosure, a vehicle seating assembly includes an upper seatbase pivotably coupled to a lower seatbase at a front end by a front hinge. The lower seatbase is slidably coupled to a rail. A seatback is pivotably coupled to a rear end of the upper seatbase by a rear hinge. A horizontal position is achieved by actuating the seatback and the upper seatbase in a forward direction while simultaneously sliding the lower seatbase rearward.

Embodiments of the second aspect of the present disclosure can include any one or a combination of the following features:
- the vehicle seating assembly further includes a concave portion in each of the seatback, the upper seatbase, and the lower seatbase, wherein the concave portions are positioned to align with one another when in the horizontal position;
- the vehicle seating assembly further includes a raised portion on a backside of the seatback and positioned above the concave portion on the seatback, wherein the raised portion is configured as a head cushion in the horizontal position;
- the concave portions have a first depth and a second depth, wherein the first depth is greater than the second depth;
- the vehicle seating assembly further includes a restraint system that is accessible in the horizontal position, wherein the restraint system is coupled to the seatback and the upper seatbase;
- the restraint system restrains an occupant in horizontal and vertical directions; and
- the vehicle seating assembly further includes a release mechanism positioned on the lower seatbase that is configured to transition the vehicle seating assembly from the horizontal position to an L-shaped position.

According to a third aspect of the present disclosure, a vehicle seating assembly includes an upper seatbase pivotably coupled to a lower seatbase at a front end by a front hinge. The lower seatbase is slidably coupled to a rail. A seatback is pivotably coupled to a rear end of the upper seatbase by a rear hinge. A horizontal position is achieved by actuating the seatback and the upper seatbase in a forward direction while simultaneously sliding the lower seatbase rearward. The upper seatbase and the lower seatbase have a width that is less than a width of the seatback.

Embodiments of the third aspect of the present disclosure can include any one or a combination of the following features:
- the width of the upper seatbase and the lower seatbase generally corresponds to a distance between rear wheel wells of a vehicle.
- the vehicle seating assembly further includes a concave portion in each of the seatback, the upper seatbase, and the lower seatbase, wherein the concave portions are positioned to align with one another when in the horizontal position; and
- the vehicle seating assembly further includes a raised portion on a backside of the seatback and positioned above the concave portion on the seatback, wherein the raised portion is configured as a head cushion in the horizontal position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
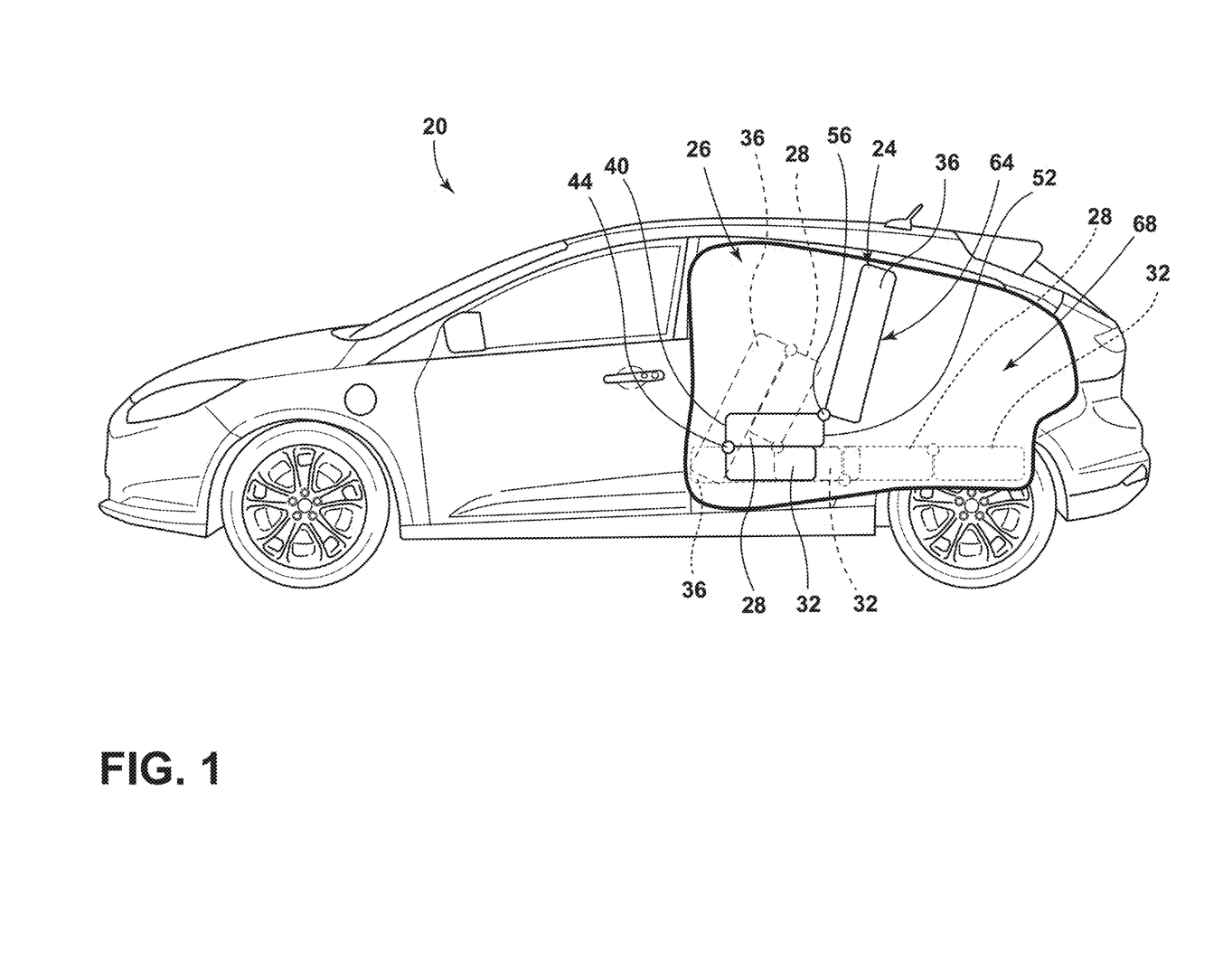
FIG. 1 is a partial cutaway side view of a vehicle illustrating a vehicle seating assembly, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seating assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-7, reference numeral 20 generally designates a vehicle. A vehicle seating assembly 24 is positioned in a cabin 26 of the vehicle 20. The vehicle seating assembly 24 includes an upper seatbase 28, a lower seatbase 32, and a seatback 36. The upper seatbase 28 is pivotably coupled to the lower seatbase 32 at a front end 40 by a front hinge 44. The lower seatbase 32 is slidably coupled to a rail 48. The seatback 36 is pivotably coupled to a rear end 52 of the upper seatbase 28 by a rear hinge 56.

Referring again to FIG. 1, the vehicle 20 may include a first row of seats 60 (FIG. 6) and a second row of seats 64. The second row of seats 64 may be positioned vehicle rearward of the first row of seats 60. Additionally, the first row of seats 60 and/or the second row of seats 64 may include one or more of the vehicle seating assemblies 24. Additional rows of seats may be located vehicle rearward of the second row of seats 64. Alternatively, a cargo area 68 may be positioned vehicle rearward of the second row of seats 64. Regardless of the number of rows of seats that are employed in the vehicle 20, the cargo area 68 is typically positioned vehicle rearward of the rearwardmost row of seats. The vehicle seating assembly 24 is shown in a first position, a second position, and a third position. The first position of the vehicle seating assembly 24 may be a generally L-shaped position and is shown in solid lines. The generally L-shaped position of the vehicle seating assembly 24 is configured to receive an occupant in a conventional seated position. The second position of the vehicle seating assembly 24 may be a transitional position, such as an intermediate position between the first and second positions, and is shown in dashed lines. The transitional position of the vehicle seating assembly 24 may provide the seatback 36 in a forward-dumped position such that the seatback 36 is in directly abutting contact with the upper seatbase 28. The transitional position may additionally provide the upper seatbase 28 as pivoted vehicle forward about the front hinge 44 such that the upper seatbase 28 and the lower seatbase 32 are in a generally non-parallel configuration. The third position of the vehicle seating assembly 24 may be a generally horizontal position and is shown in dotted lines. The generally horizontal position of the vehicle seating assembly 24 may be utilized to increase a volume of the cargo area 68. Alternatively, the horizontal position of the vehicle seating assembly 24 may provide a generally flat surface for an occupant to lie upon while the vehicle 20 is stationary or in motion, for example, to rest or sleep.

Figures 2, 3, 4:
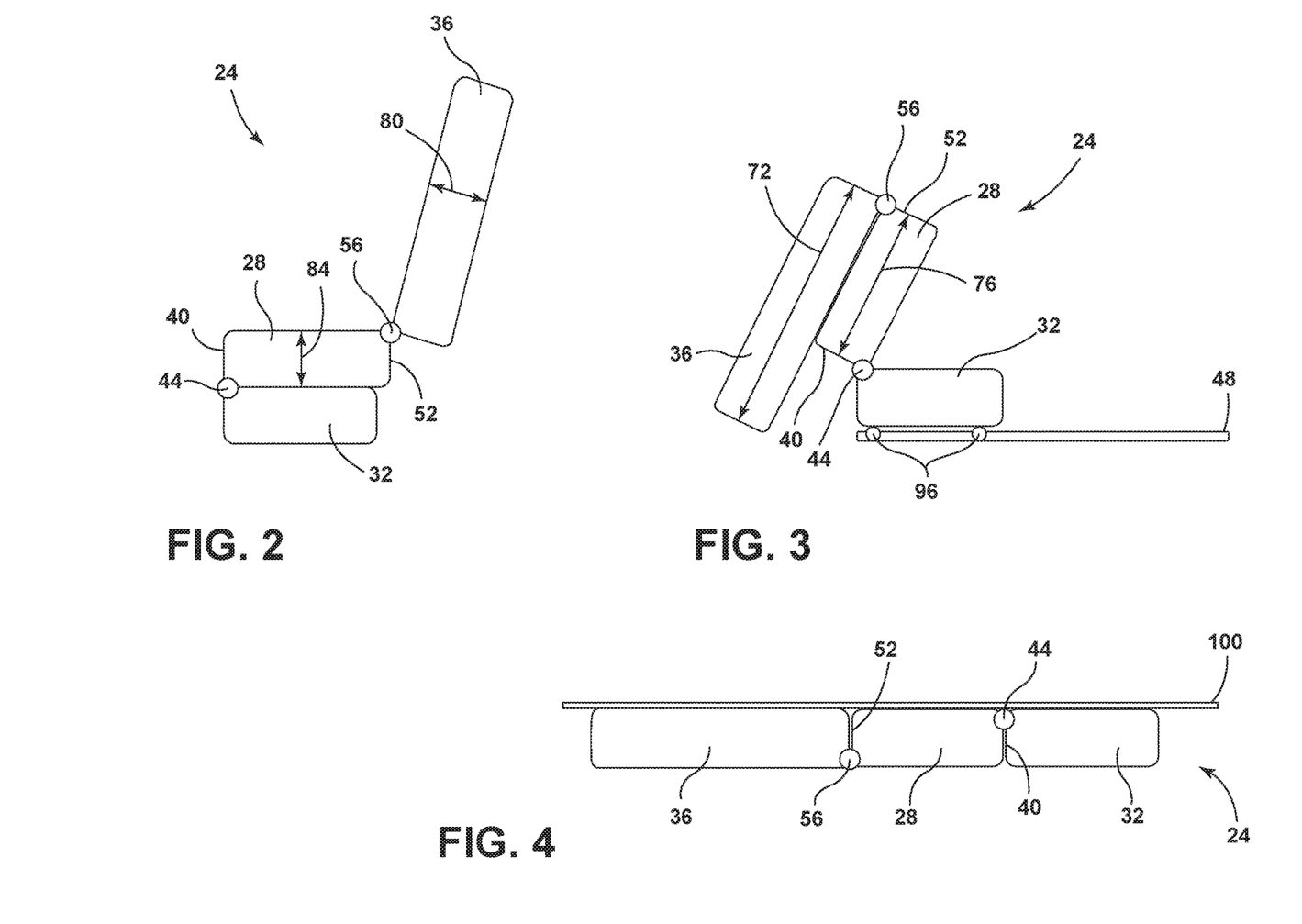
FIG. 2 is a side view of the vehicle seating assembly illustrating an L-shaped position, according to one embodiment.
FIG. 3 is a side view of the vehicle seating assembly illustrating a transitional position, according to one embodiment.
FIG. 4 is a side view of the vehicle seating assembly illustrating a horizontal position, according to one embodiment.

Referring to FIGS. 2 and 3, the vehicle seating assembly 24 is shown in the generally L-shaped position (FIG. 2) and the transitional position (FIG. 3). The upper seatbase 28 and the lower seatbase 32 may be similar in height, length, and/or width. In some embodiments, the upper seatbase 28 and the lower seatbase 32 may have substantially the same dimensions such that the upper seatbase 28 and the lower seatbase 32 present a user with an integrated or unitary seatbase appearance. Said another way, the upper seatbase 28 and the lower seatbase 32 may appear to be a single unit until a user actuates the vehicle seating assembly 24 to a position other than the L-shaped position. In some embodiments, the seatback 36 may have some dimensions that are similar to the upper seatbase 28 and/or lower seatbase 32 while other dimensions of the seatback 36 differ from those of the upper seatbase 28 and/or the lower seatbase 32. For example, the seatback 36 may have a length 72 that is greater than a length 76 of the upper seatbase 28 and/or the lower seatbase 32. In further embodiments, a height 80 of the seatback may be similar to a height 84 of the upper seatbase 28 and/or the lower seatbase 32. A width 88 of the seatback 36 may be greater than a width 92 of the seatbase (see FIGS. 6 and 7). Alternatively, the width 88 of the seatback 36 and the width 92 of the upper seatbase 28 and/or the lower seatbase 32 may be substantially similar.

Referring again to FIGS. 2 and 3, the front hinge 44 and/or the rear hinge 56 may be at least partially recessed within the vehicle seating assembly 24 such that a user is presented with an aesthetically pleasing exterior of the vehicle seating assembly 24, an exterior surface of the vehicle seating assembly 24 maintains a substantially continuous or smooth appearance, and/or pinching hazards where the front hinge 44 and the rear hinge 56 are located are decreased. The lower seatbase 32 may be slidably coupled to the rail 48 by one or more slidable members 96. The slidable members 96 may be, but are not limited to, wheels, dowels, hooks, cables, pins, and the like. The vehicle seating assembly 24 may be transitioned away from the L-shaped position by actuating the upper seatbase 28 and/or the seatback 36 in a generally forward direction. In some embodiments, as the vehicle seating assembly 24 is transitioned away from the L-shaped position, for example, by actuating the upper seatbase 28 and the seatback 36 in a forward direction, the lower seatbase 32 simultaneous slides along the rail 48 in a rearward direction. The transition from the position shown in FIG. 2 to the position shown in FIG. 3 may be accomplished by pivoting the seatback 36 in a forward direction about the rear hinge 56 such that the seatback 36 moves towards an upper surface of the upper seatbase 28. Next, the upper seatbase 28 and the seatback 36 may be actuated in a generally forward direction by pivotable motion about the front hinge 44.

Referring to FIG. 4, the vehicle seating assembly 24 is shown in the horizontal position. The horizontal position of the vehicle seating assembly 24 generally corresponds with a horizontal plane 100. The horizontal plane 100 may be generally parallel to a ground that the vehicle 20 (FIG. 1) rests upon. Alternatively, the horizontal plane 100 may be generally parallel to at least a portion of the cabin 26, such as a floor of the cargo area 68 (FIG. 1) and/or a floor pan of the vehicle 20. The vehicle seating assembly 24 may transition from the transitional position (FIG. 3) to the horizontal position depicted here by pivoting the seatback 36 in a rearward direction about the rear hinge 56 while simultaneously or sequentially pivoting the upper seatbase 28 in the forward direction about the front hinge 44. Alternatively, the upper seatbase 28 may be pivoted in the forward direction about the front hinge 44 while simultaneously or sequentially pivoting the seatback 36 in a rearward direction about the rear hinge 56. Finally, the lower seatbase 32 may be actuated in a rearward direction along the rail 48 simultaneously or sequentially to the actuation of the upper seatbase 28 and/or the seatback 36.

Figure 5:
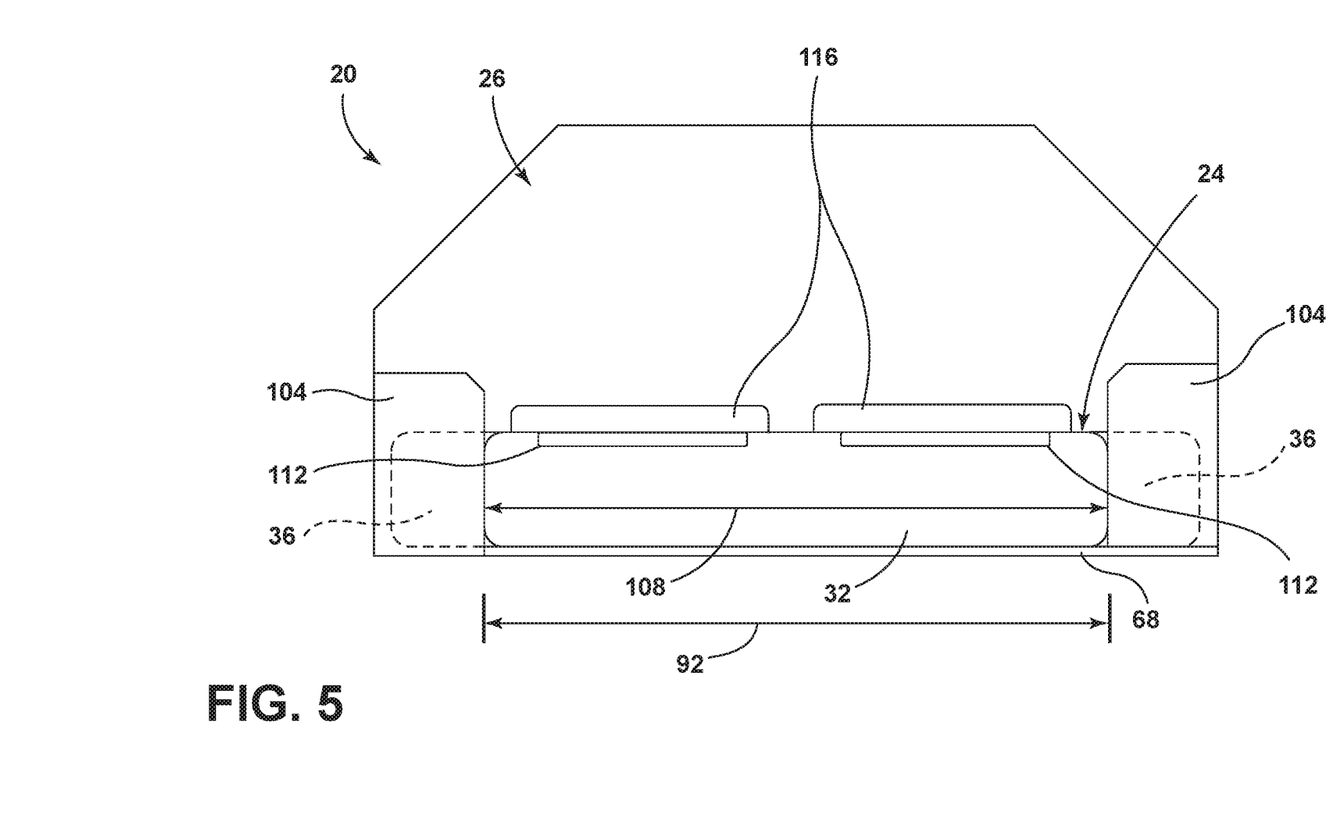
FIG. 5 is a rear view of a cabin of the vehicle illustrating the vehicle seating assembly in the horizontal position, according to one embodiment.

Referring now to FIG. 5, the cabin 26 of the vehicle 20 may include rear wheel wells 104 that are located in the cargo area 68. The vehicle seating assembly 24 is shown in the horizontal position. When in the horizontal position, the lower seatbase 32 and/or the upper seatbase 28 may extend rearward into the cargo area 68 and be positioned between the rear wheel wells 104. Accordingly, the width 92 of the lower seatbase 32 and/or the upper seatbase 28 may generally correspond to a distance 108 between the rear wheel wells 104. In some embodiments, the rear wheel wells 104 may not extend into the cabin 26 of the vehicle 20 or the lower seatbase 32 and/or the upper seatbase 28 may not extend rearward far enough to be co-localized with the rear wheel wells 104. In either case, the width 92 of the lower seatbase 32 and/or the upper seatbase 28 need not be configured to fit between the rear wheel wells 104.

Referring again to FIG. 5, in some embodiments, the vehicle seating assembly 24 may include a concave portion 112 in the upper seatbase 28, the lower seatbase 32, and/or the seatback 36. In embodiments where the concave portion 112 is present in more than one of the upper seatbase 28, the lower seatbase 32, and the seatback 36, the concave portions 112 may be positioned to align with one another when the vehicle seating assembly 24 is placed in the horizontal position. By so positioning the concave portions 112, the horizontal position of the vehicle seating assembly 24 may present a user with a recessed area in which to lie down or rest. Side walls of the concave portions 112 may provide at least some lateral retention of the occupant during vehicle maneuvers or as they move in their sleep. The vehicle seating assembly 24 may further include a raised portion 116 on a backside of the seatback 36. The raised portion 116 may be positioned above the uppermost concave portion 112, such as above the concave portion 112 on the seatback 36. The raised portion 116 may be configured as a head cushion when the vehicle seating assembly 24 is in the horizontal position.

Figure 6:
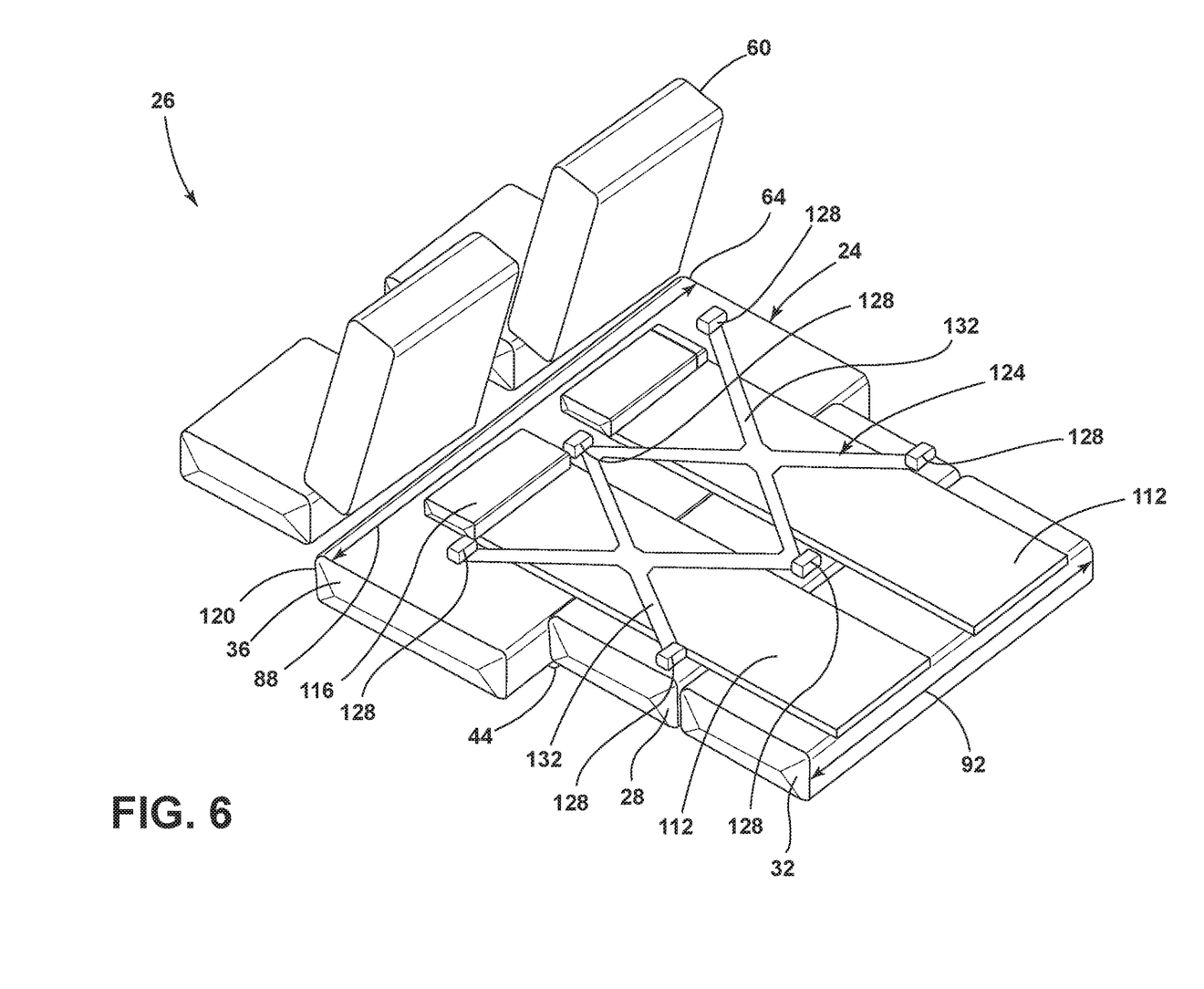
FIG. 6 is a top perspective view of the vehicle seating assembly in the horizontal position, illustrating a restraint system, according to one embodiment.
Figure 7:
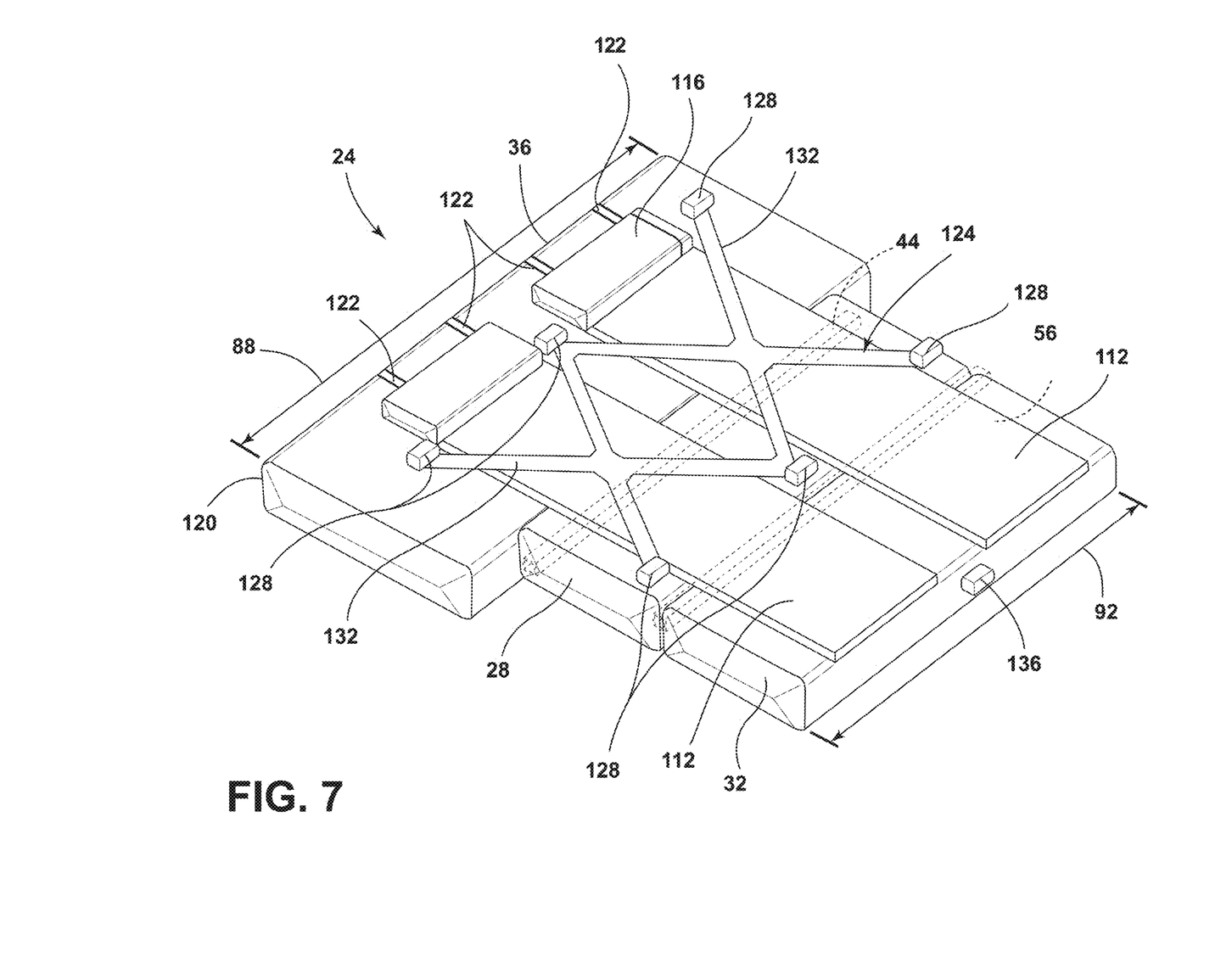
FIG. 7 is a top perspective view of the vehicle seating assembly in the horizontal position, illustrating the restraint system and a release mechanism, according to one embodiment.

Referring to FIGS. 6 and 7, a top portion 120 of the seatback 36 may be positioned in close proximity to the first row of seats 60 when the vehicle seating assembly 24 is in the horizontal position. The raised portion 116 may be a headrest that has been rotated from the top portion 120 of the seatback 36 to the backside of the seatback 36. Said another way, the vehicle seating assembly 24 may further include a headrest that is extendable from the top portion 120 of the seatback 36 when the vehicle seating assembly 24 is in the L-shaped position. When the vehicle seating assembly 24 is placed in the horizontal position, the headrest may be rotated rearward to the backside of the seatback 36 e.g., by way of channels 122) such that the headrest is provided as the head cushion to a user lying in the concave portions 112. The concave portions 112 may have a first depth and a second depth. The first depth may be greater than the second depth. Additionally, the second depth may be positioned on either side of the first depth such that the walls of the concave portion 112 may provide increased retention to a user as the user moves from a middle of the concave portion 112 toward an edge of the concave portion 112, which may be collinear with the backside of the seatback 36.

Referring again to FIGS. 6 and 7, one of the front hinge 44 and the rear hinge 56 may be fully recessed within the vehicle seating assembly 24 while the other of the front hinge 44 and the rear hinge 56 may be at least partially protrude from the vehicle seating assembly 24 (FIG. 6). Alternatively, the front hinge 44 and the rear hinge 56 may each be fully recessed within the vehicle seating assembly 24 (FIG. 7). In the embodiment depicted in FIG. 6, the front hinge 44 at least partially protrudes from the vehicle seating assembly 24 when the vehicle seating assembly 24 is in the horizontal position. While the depicted embodiment shows the front hinge 44 as at least partially protruding from the vehicle seating assembly 24 in the horizontal position, when the vehicle seating assembly 24 is articulated to the L-shaped position, the front hinge 44 may be fully covered by the cushions present on the upper seatbase 28 and the seatback 36 such that an occupant of the vehicle seating assembly 24 is free of direct physical contact with the front hinge 44.

Referring further to FIGS. 6 and 7, the vehicle seating assembly 24 may further include a restraint system 124 that is accessible when the vehicle seating assembly 24 is in the horizontal position. The restraint system 124 may be coupled to the seatback 36 and the upper seatbase 28. The restraint system 124 may include a plurality of anchors 128. The anchors 128 may be positioned on opposite sides of the concave portion 112 and/or on the same side of the concave portion 112 as at least one other anchor 128. The restraint system 124 further includes one or more occupant restraints 132, such as a seatbelt. The occupant restraints 132 can be sized to accommodate various sizes of occupants and may additionally be retractably coupled to at least one of the anchors 128. The occupant restraints 132 may be configured in an X-shaped arrangement such that an occupant of the concave portion 112 is retained in the concave portion 112 by a four-point harness. In general, the restraint system 124 is configured to restrain an occupant in horizontal and vertical directions while the vehicle 20 is in motion or at rest. In embodiments that provide more than one area for an occupant to lay down or rest, such as those depicted here, the anchors 128 that are positioned between the adjacent concave portions 112 that make up the separate resting areas may be utilized by the restraint system 124 for the resting areas on either side of the anchors 128.

Referring still further to FIGS. 6 and 7, the vehicle seating assembly 24 may be capable of being locked in the horizontal position to avoid unintentional transitions of the vehicle seating assembly 24 between the various positions that the vehicle seating assembly 24 is capable of assuming. In such an embodiment, the vehicle seating assembly 24 may further include a release mechanism 136 that may be actuated to unlock the vehicle seating assembly 24 from the horizontal position such that the vehicle seating assembly may be transitioned from the horizontal position to one of the other positions the vehicle seating assembly 24 is capable of assuming, such as the L-shaped position. The release mechanism 136 may be positioned on the lower seatbase 32. It is contemplated that the release mechanism 136 may be alternatively positioned on the vehicle seating assembly 24 or elsewhere within the cabin 26 of the vehicle 20 without departing from the concepts disclosed herein. Alternatively, the vehicle seating assembly 24 may be a powered seating assembly such that the vehicle seating assembly 24 may be articulated and locked into the various positions that it is capable of assuming by responding to commands received from a controller that may be operated through a user interface, such as the instrument panel or dashboard.

Vehicles 20 can be utilized for extended trips or long rides. Often, when the vehicle 20 is being utilized for an extended trip or long ride, at least one of the occupants wishes to rest or sleep during the travel time. The occupant may be an adult or child of various ages. Most vehicle seating assemblies provide, at best, the ability to recline the seatback 36 a limited amount. However, conventional vehicle seating assemblies, particularly those located in the second row of seats 64, do not permit the occupant to lie in a substantially horizontal position. Additionally, conventional vehicle seating assemblies that are located in the second row of seats 64 do not typically allow more than one occupant to lie in a substantially horizontal position simultaneously. Accordingly, the vehicle seating assembly 24 of the present disclosure provides the occupant with a comfortable area to rest that is capable of assuming a substantially horizontal position while providing retention of the occupant in horizontal and vertical directions.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described concepts, and other components, is not limited to any specific material. Other exemplary embodiments of the concepts disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise.

What is claimed is:

1. A vehicle seating assembly, comprising:
   an upper seatbase;
   a lower seatbase pivotably coupled to the upper seatbase at a vehicle-forward end of the lower seatbase by a front hinge, the front hinge being directly connected to a first end of the upper seatbase and the vehicle-forward end of the lower seatbase such that the front hinge is in direct physical contact with the upper seatbase and the lower seatbase, wherein the lower seatbase is slidably coupled to a rail; and
   a seatback pivotably coupled to the upper seatbase by a rear hinge, the rear hinge being positioned between a second end of the upper seatbase that is opposite the first end and a lower end of the seatback, the rear hinge being directly connected to the seatback and the upper seatbase such that the rear hinge is in direct physical contact with the seatback and the upper seatbase, wherein pivotable motion about the front hinge and the rear hinge enables movement between a first configuration and a second configuration, and wherein the lower seatbase remains permanently coupled to the rail throughout movement between the first configuration and the second configuration.

2. The vehicle seating assembly of claim 1, wherein the first configuration is an L-shaped position and the second configuration is a horizontal position, wherein the horizontal position places the vehicle-forward end of the lower seatbase in-line with, and immediately adjacent to, the first end of the upper seatbase, wherein the horizontal position places the second end of the upper seatbase in line with, and immediately adjacent to, the lower end of the seatback.

3. The vehicle seating assembly of claim 2, wherein the horizontal position places the front hinge proximal to a top side of the vehicle seating assembly, and wherein the horizontal position places the rear hinge proximal to a bottom side of the vehicle seating assembly.

4. The vehicle seating assembly of claim 2, further comprising:
   a recessed area in each of the seatback, the upper seatbase, and the lower seatbase, wherein the recessed areas are positioned to align with one another when in the horizontal position.

5. The vehicle seating assembly of claim 4, wherein the recessed areas have a first depth and a second depth, and wherein the first depth is greater than the second depth.

6. The vehicle seating assembly of claim 4, further comprising:
   a raised portion on a backside of the seatback and positioned above the recessed area on the seatback, wherein the raised portion is configured as a head cushion in the horizontal position.

7. The vehicle seating assembly of claim 6, wherein the raised portion is a headrest that has been rotated from a top portion of the seatback to the backside of the seatback.

8. The vehicle seating assembly of claim 2, further comprising:
   a restraint system that is accessible in the horizontal position, wherein the restraint system is coupled to the seatback and the upper seatbase.

9. The vehicle seating assembly of claim 8, wherein the restraint system restrains an occupant in horizontal and vertical directions.

10. A vehicle seating assembly, comprising:
    an upper seatbase;
    a lower seatbase pivotably coupled to the upper seatbase at a vehicle-forward end of the lower seatbase by a front hinge, the front hinge being directly connected to a first end of the upper seatbase and the vehicle-forward end of the lower seatbase such that the front hinge is in direct physical contact with the upper seatbase and the lower seatbase, wherein the front hinge is fully recessed between the upper seatbase and the lower seatbase, and wherein the lower seatbase is slidably coupled to a rail; and
    a seatback pivotably coupled to the upper seatbase by a rear hinge, the rear hinge being positioned between a second end of the upper seatbase that is opposite the first end and a lower end of the seatback, the rear hinge being directly connected to the seatback and the upper seatbase such that the rear hinge is in direct physical contact with the seatback and the upper seatbase, wherein the rear hinge is fully recessed between the seatback and the upper seatbase, wherein pivotable motion about the front hinge and the rear hinge enables movement between an L-shaped position and a horizontal position, wherein the horizontal position places the vehicle-forward end of the lower seatbase in-line with, and immediately adjacent to, the first end of the upper seatbase, wherein the horizontal position places the second end of the upper seatbase in line with, and immediately adjacent to, the lower end of the seatback, and wherein the front and rear hinges each remain fully recessed in each of the L-shaped position and the horizontal position.

11. The vehicle seating assembly of claim 10, wherein the horizontal position places the front hinge proximal to a top side of the vehicle seating assembly, and wherein the horizontal position places the rear hinge proximal to a bottom side of the vehicle seating assembly.

12. The vehicle seating assembly of claim 10, further comprising:
    a restraint system that is accessible in the horizontal position, wherein the restraint system is coupled to the seatback and the upper seatbase.

13. The vehicle seating assembly of claim 12, wherein the restraint system restrains an occupant in horizontal and vertical directions.

14. The vehicle seating assembly of claim 10, further comprising:
    a recessed area in each of the seatback, the upper seatbase, and the lower seatbase, wherein the recessed areas are positioned to align with one another when in the horizontal position.

15. The vehicle seating assembly of claim 14, further comprising:
    a raised portion on a backside of the seatback and positioned above the recessed area on the seatback, wherein the raised portion is configured as a head cushion in the horizontal position.

16. The vehicle seating assembly of claim 14, wherein the recessed areas have a first depth and a second depth, and wherein the first depth is greater than the second depth.

17. A vehicle seating assembly, comprising:
    an upper seatbase;
    a lower seatbase pivotably coupled to the upper seatbase at a vehicle-forward end of the lower seatbase by a front hinge, the front hinge being directly connected to a first end of the upper seatbase and the vehicle-forward end of the lower seatbase such that the front hinge is in direct physical contact with the upper seatbase and the lower seatbase, wherein the front hinge is fully recessed between the upper seatbase and the lower seatbase, wherein the lower seatbase is slidably coupled to a rail, and wherein the lower seatbase remains permanently coupled to the rail throughout movement between the first configuration and the second configuration; and a seatback pivotably coupled to the upper seatbase by a rear hinge, the rear hinge being positioned between a second end of the upper seatbase that is opposite the first end and a lower end of the seatback, the rear hinge being directly connected to the seatback and the upper seatbase such that the rear hinge is in direct physical contact with the seatback and the upper seatbase, wherein the rear hinge is fully recessed between the seatback and the upper seatbase, wherein pivotable motion about the front hinge and the rear hinge enables movement between an L-shaped position and a horizontal position, wherein the front and rear hinges each remain fully recessed in each of the L-shaped position and the horizontal position, wherein the horizontal position places the vehicle-forward end of the lower seatbase in-line with, and immediately adjacent to, the first end of the upper seatbase, wherein the horizontal position places the second end of the upper seatbase in line with, and immediately adjacent to, the lower end of the seatback, and wherein the upper seatbase and the lower seatbase have a width that is less than a width of the seatback.

18. The vehicle seating assembly of claim 17, wherein the width of the upper seatbase and the lower seatbase generally corresponds to a distance between rear wheel wells of a vehicle.

19. The vehicle seating assembly of claim 18, further comprising:

a recessed area in each of the seatback, the upper seatbase, and the lower seatbase, wherein the recessed areas are positioned to align with one another when in the horizontal position.

20. The vehicle seating assembly of claim 19, further comprising:

a raised portion on a backside of the seatback and positioned above the recessed area on the seatback, wherein the raised portion is configured as a head cushion in the horizontal position.

* * * * *